(12) United States Patent
Gao et al.

(10) Patent No.: US 12,743,482 B2
(45) Date of Patent: Sep. 22, 2026

(54) SYSTEMS AND METHODS FOR COMMUNICATION-EFFICIENT MODEL AGGREGATION IN FEDERATED NETWORKS FOR CONNECTED VEHICLE APPLICATIONS

(71) Applicant: Toyota Motor Engineering & Manufacturing North America, Inc., Plano, TX (US)

(72) Inventors: Hao Gao, Mountain View, CA (US); Yongkang Liu, Mountain View, CA (US); Emrah Akin Sisbot, Mountain View, CA (US); Kentaro Oguchi, Mountain View, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 865 days.

(21) Appl. No.: 17/968,175

(22) Filed: Oct. 18, 2022

(65) Prior Publication Data

US 2024/0126836 A1 Apr. 18, 2024

(51) Int. Cl.

| | |
|---|---|
| ***G06N 20/20*** | (2019.01) |
| ***G06F 18/21*** | (2023.01) |
| ***G06N 20/00*** | (2019.01) |
| ***G07C 5/00*** | (2006.01) |

(52) U.S. Cl.

CPC ............ *G06F 18/21* (2023.01); *G06N 20/00* (2019.01); *G06N 20/20* (2019.01); *G07C 5/008* (2013.01)

(58) Field of Classification Search

CPC ........ G06F 18/21; G06N 20/00; G06N 20/20; G07C 5/008

See application file for complete search history.

(56) References Cited

U.S. PATENT DOCUMENTS

| | | | | |
|---|---|---|---|---|
| 12,175,338 B2 * | 12/2024 | Zhou | ...................... | G06N 3/098 |
| 2020/0017117 A1 * | 1/2020 | Milton | ...................... | G06N 3/09 |
| 2021/0287114 A1 * | 9/2021 | Zhou | ...................... | G06N 20/20 |
| 2021/0295215 A1 * | 9/2021 | Acharya | ................ | G06N 20/20 |

(Continued)

FOREIGN PATENT DOCUMENTS

| | | |
|---|---|---|
| CN | 110288094 B | 12/2020 |
| CN | 112235062 A | 1/2021 |

(Continued)

OTHER PUBLICATIONS

Wu et al., "Fast-Convergent Federated Learning With Adaptive Weighting", 2021, p. 1082 (Year: 2021).*

(Continued)

*Primary Examiner* — Beau D Spratt
(74) *Attorney, Agent, or Firm* — Dinsmore & Shohl LLP

(57) ABSTRACT

A server for communication-efficient model aggregation in federated networks for connected vehicle applications is provided. The server includes a controller programmed to: obtain contributions of a plurality of vehicles in a federated learning framework; determine weights for local gradients received from the plurality of vehicles based on the contributions; adjust the weights based on a comparison of potential functions for the plurality of vehicles; and aggregate the local gradients based on the adjusted weights to obtain a global model.

14 Claims, 7 Drawing Sheets

(56) References Cited

U.S. PATENT DOCUMENTS

| | | | | |
|---|---|---|---|---|
| 2021/0374617 | A1* | 12/2021 | Chu | G06N 3/084 |
| 2022/0250656 | A1* | 8/2022 | Ucar | G06N 20/00 |
| 2023/0117768 | A1* | 4/2023 | Shaloudegi | G06N 20/00 706/12 |
| 2023/0177349 | A1* | 6/2023 | Balakrishnan | G06N 3/084 706/25 |
| 2023/0177404 | A1* | 6/2023 | Rawashdeh | G06N 3/084 706/12 |
| 2025/0119245 | A1* | 4/2025 | Jung | H04L 1/22 |

FOREIGN PATENT DOCUMENTS

| | | | |
|---|---|---|---|
| CN | 112329940 | A | 2/2021 |
| CN | 111027715 | B | 4/2021 |
| CN | 112784994 | A | 5/2021 |
| CN | 113626168 | A | 11/2021 |
| CN | 113642737 | A | 11/2021 |
| CN | 113723617 | A | 11/2021 |
| CN | 113920780 | A | 1/2022 |
| CN | 113283177 | B | 5/2022 |
| WO | 2021204040 | A1 | 10/2021 |
| WO | 2022105022 | A1 | 5/2022 |

OTHER PUBLICATIONS

Arccos federated learning (Year: 2021).*

Jake Perazzone, et al., "Communication-Efficient Device Scheduling for Federated Learning Using Stochastic Optimization," May 4, 2022.

Hongda Wu, et al., "Fast-Convergent Federated Learning With Adaptive Weighting," IEEE Transactions on Cognitive Communications and Networking, Dec. 2021, vol. 7, No. 4, pp. 1078-1088.

Yingda Xia, et al., "Auto-FedAvg: Learnable Federated Averaging for Multi-Institutional Medical Image Segmentation," Apr. 20, 2021.

Yang Chen, et al., "Communication-Efficient Federated Deep Learning with Asynchronous Model Update and Temporally Weighted Aggregation," Mar. 18, 2019.

H. Brendan Mcmahan, et al., "Communication-Efficient Learning of Deep Networks from Decentralized Data," Proceedings of the 20th International Conference on Artificial Intelligence and Statistics (AISTATS) Feb. 28, 2017 Fort Lauderdale, Florida, vol. 54.

* cited by examiner $$\textit{Contribution: } \theta_i(t) = \arccos \frac{\langle \nabla F(\mathrm{w}(t)), \nabla F_i(\mathrm{w}(t)) \rangle}{\|\nabla F(\mathrm{w}(t))\| \, \|\nabla F_i(\mathrm{w}(t))\|}$$

· $\nabla F(w(t))$ is the global gradient and $\nabla F_i(w(t))$ is the local gradient.

SYSTEMS AND METHODS FOR COMMUNICATION-EFFICIENT MODEL AGGREGATION IN FEDERATED NETWORKS FOR CONNECTED VEHICLE APPLICATIONS

TECHNICAL FIELD

The present disclosure relates to systems and methods for communication-efficient model aggregation in federated networks for connected vehicle applications.

BACKGROUND

In vehicular technologies, such as object detection for vehicle cameras, the distributed learning framework is still under exploration. With the rapidly growing amount of raw data collected at individual vehicles, in the aspect of user privacy, the requirement of wiping out personalized, confidential information and the concern for private data leakage motivate a machine learning model that does not require raw data transmission. In the meantime, raw data transmission to the data center becomes heavier or even infeasible or unnecessary to transmit all raw data. Without sufficient raw data transmitted to the data center due to communication bandwidth constraints or limited storage space, a centralized model cannot be designed in the conventional machine learning paradigm. Federated learning, a distributed machine learning framework, is employed when there are communication constraints and privacy issues. The model training is conducted in a distributed manner under a network of many edge clients and a centralized controller. However, the current federated learning requires a plurality of communication rounds to obtain optimal weights for a machine learning model because data distribution could be largely different across users.

Accordingly, a need exists for a federated learning system that accelerates the convergence speed of a training process and reduces the total number of communication rounds.

SUMMARY

The present disclosure provides systems and methods for communication-efficient model aggregation in federated networks for connected vehicle applications.

In one embodiment, a server for communication-efficient model aggregation in federated networks for connected vehicle applications is provided. The server includes a controller programmed to: obtain contributions of a plurality of vehicles in a federated learning framework; determine weights for local gradients received from the plurality of vehicles based on the contributions; adjust the weights based on a comparison of potential functions for the plurality of vehicles; and aggregate the local gradients based on the adjusted weights to obtain a global model.

In another embodiment, a method for aggregating models from a plurality of vehicles is provided. The method includes obtaining contributions of the plurality of vehicles in a federated learning framework; determining weights for local gradients received from the plurality of vehicles based on the contributions; adjusting the weights based on a comparison of potential functions for the plurality of vehicles; and aggregating the local gradients based on the adjusted weights to obtain a global model.

In another embodiment, a system for communication-efficient model aggregation in federated networks for connected vehicle applications is provided. The system includes a plurality of vehicles; and a server comprising a controller programmed to: obtain contributions of the plurality of vehicles in a federated learning framework; determine weights for local gradients received from the plurality of vehicles based on the contributions; adjust the weights based on a comparison of potential functions for the plurality of vehicles; and aggregate the local gradients based on the adjusted weights to obtain a global model. The plurality of vehicles receive the global model from the server and operate based on the global model.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include communication-efficient model aggregation in federated networks for connected vehicle applications. The system includes a system including a plurality of vehicles; and a server comprising a controller. The controller obtains contributions of the plurality of vehicles in a federated learning framework, determines weights for local gradients received from the plurality of vehicles based on the contributions, adjusts the weights based on a comparison of potential functions for the plurality of vehicles, and aggregates the local gradients based on the adjusted weights to obtain a global model. The plurality of vehicles receive the global model from the server and operate based on the global model. The system only uses gradient information, which preserves the privacy of users without using private data of edge nodes. Specifically, the contributions of users are measured by an angle between local gradients and a global gradient. The system also utilizes a game theory-based approach to analytically map the contributions of users to their weights. Specifically, the system designs a utility function that helps achieving better trade-off between highest average contribution and diversity of gradient information. Further, the present system accelerates the convergence speed of a training process in hierarchical federated learning framework, which reduces the total number of communication rounds.

Figure 1:
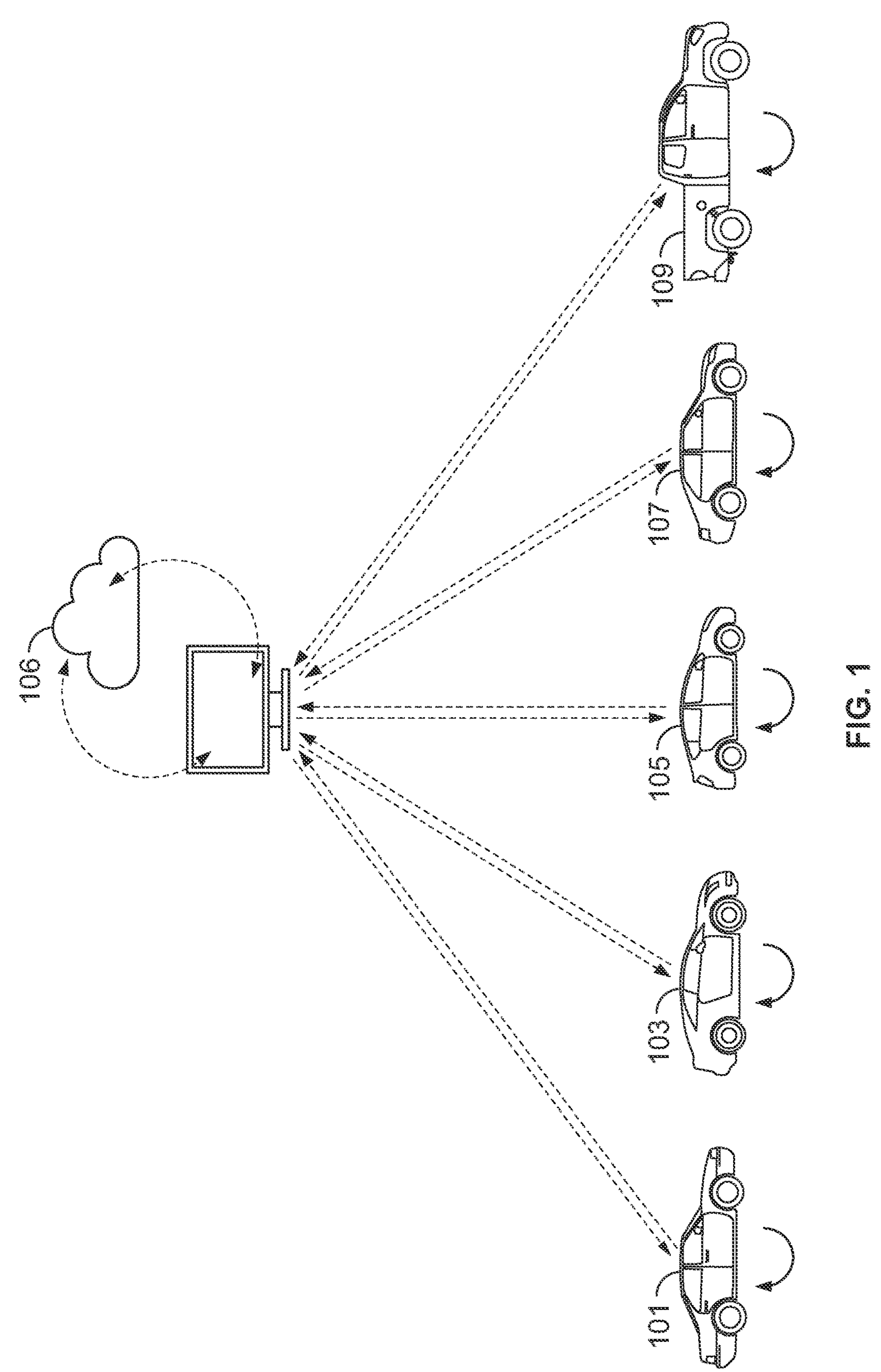
FIG. 1 schematically depicts a system for communication-efficient model aggregation in federated networks for connected vehicle applications, in accordance with one or more embodiments shown and described herewith.

FIG. 1 schematically depicts a system for communication-efficient model aggregation in federated networks for connected vehicle applications, in accordance with one or more embodiments shown and described herewith.

The system includes a plurality of edge nodes 101, 103, 105, 107, and 109, and a server 106. Training for a model is conducted in a distributed manner under a network of the edge nodes 101, 103, 105, 107, and 109 and the server 106. The model may include an image processing model, an object perception model, or any other model that may be utilized by vehicles in operating the vehicles. The model may be a machine learning model including, but not limited to, supervised learning models such as neural networks, decision trees, linear regression, and support vector machines, unsupervised learning models such as Hidden Markov models, k-means, hierarchical clustering, and Gaussian mixture models, and reinforcement learning models such as temporal difference, deep adversarial networks, and Q-learning. While FIG. 1 depicts five edge nodes, the system may include more than or less than five edge nodes. Edge nodes 101, 103, 105, 107, and 109 may have different datasets and different computing resources.

In embodiments, each of the edge nodes 101, 103, 105, 107, and 109 may be a vehicle, and the server 106 may be a centralized server, an edge server, or another vehicle. The vehicle may be an automobile or any other passenger or non-passenger vehicle such as, for example, a terrestrial, aquatic, and/or airborne vehicle. The vehicle is an autonomous vehicle that navigates its environment with limited human input or without human input. Each vehicle may drive on a road and perform vision-based lane centering, e.g., using a forward facing camera. Each vehicle may include actuators for driving the vehicle, such as a motor, an engine, or any other powertrain. In some embodiments, each of the edge nodes 101, 103, 105, 107, and 109 may be an edge server, and the server 106 may be a centralized server. In some embodiments, the edge nodes 101, 103, 105, 107, and 109 are vehicle nodes, and the vehicles may communicate with a centralized server such as the server 106 via an edge server.

In embodiments, the server 106 sends an initialized model to each of the edge nodes 101, 103, 105, 107, and 109. The initialized model may be any model that may be utilized for operating a vehicle, for example, an image processing model, an object detection model, or any other model for advanced driver assistance systems. Each of the edge nodes 101, 103, 105, 107, and 109 trains the received initialized model using local data and transmits updated gradient information to the server 106 after the training. In some embodiments, each of the edge nodes 101, 103, 105, 107, and 109 may also train the received initialized model using local data to obtain an updated local model and sends the updated local model or parameters of the updated local model back to the server 106.

The server 106 may aggregate the local gradients received from the edge nodes 101, 103, 105, 107, 109 to obtain an updated global model. Specifically, the server 106 may compute the weighted average of the edge nodes 101, 103, 105, 107, 109 gradients to obtain the updated global model. In some embodiments, the server 106 collects the updated local models, computes a global model based on the updated local models, and sends the global model to each of the edge nodes 101, 103, 105, 107, and 109. Due to communication and privacy issues in vehicular object detection applications, such as dynamic mapping, self-driving, and road status detection, the federated learning framework can be an effective framework for addressing these issues in traditional centralized models. The edge nodes 101, 103, 105, 107, and 109 may be in different areas with different driving conditions. For example, some of the edge nodes 101, 103, 105, 107, and 109 are driving in a rural area, some are driving in a suburb, and some are driving in a city. In addition, the edge nodes 101, 103, 105, 107, and 109 may have different computing power and be equipped different types of sensors and/or different numbers of sensors.

In embodiments, the server 106 considers heterogeneity of the edge nodes, i.e., different sensors and different computing resources of the edge nodes when computing a global model based on the updated local models. Specifically, the local gradients from the edge nodes 101, 103, 105, 107, and 109 are different from each other due to heterogeneity of the edge nodes. The server 106 determines contributions of the edge nodes 101, 103, 105, 107, and 109 based on the local gradients, and computes appropriate weights for the models of the edge nodes 101, 103, 105, 107, and 109 based on the contributions. Details about computing a global model based on the local gradients and contributions will be described with reference to FIGS. 2-5 below.

Figure 1A:
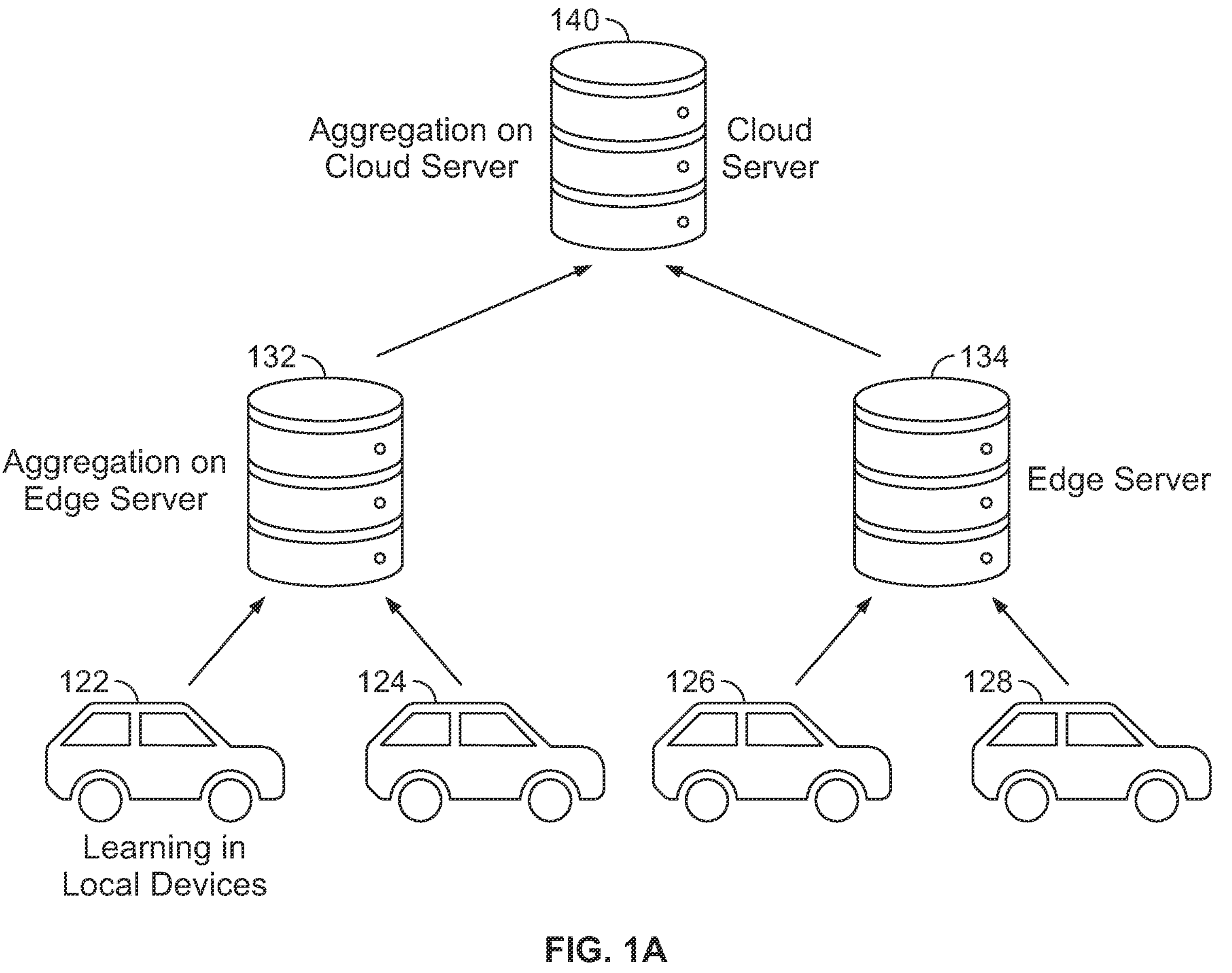
FIG. 1A depicts model aggregation in hierarchical federated networks, in accordance with one or more embodiments shown and described herewith.

FIG. 1A depicts model aggregation in hierarchical federated networks. In FIG. 1A, the edge nodes 122, 124 communicate with the edge server 132, and the edge nodes 126, 128 communicate with the edge server 134. The edge servers 132, 134 communicate with the cloud server 140. Each of the edge nodes 122, 124 transmits its local gradient to the edge server 132 and the edge server 132 determines weights for the local gradients and computes weighted average of the local gradients using the determined weights. Similarly, each of the edge nodes 126, 128 transmits its local gradient to the edge server 134 and the edge server 134 determines weights for the local gradients and computes weighted average of the local gradients using the determined weights. Each of the edge servers 132, 134 generates local gradients after training its model and transmits the local gradients to the cloud server 140. The cloud server 140 determines weights for the local gradients received from the edge servers 132 and 134 and computes weighted average of the local gradients using the determined weights.

Figure 2:
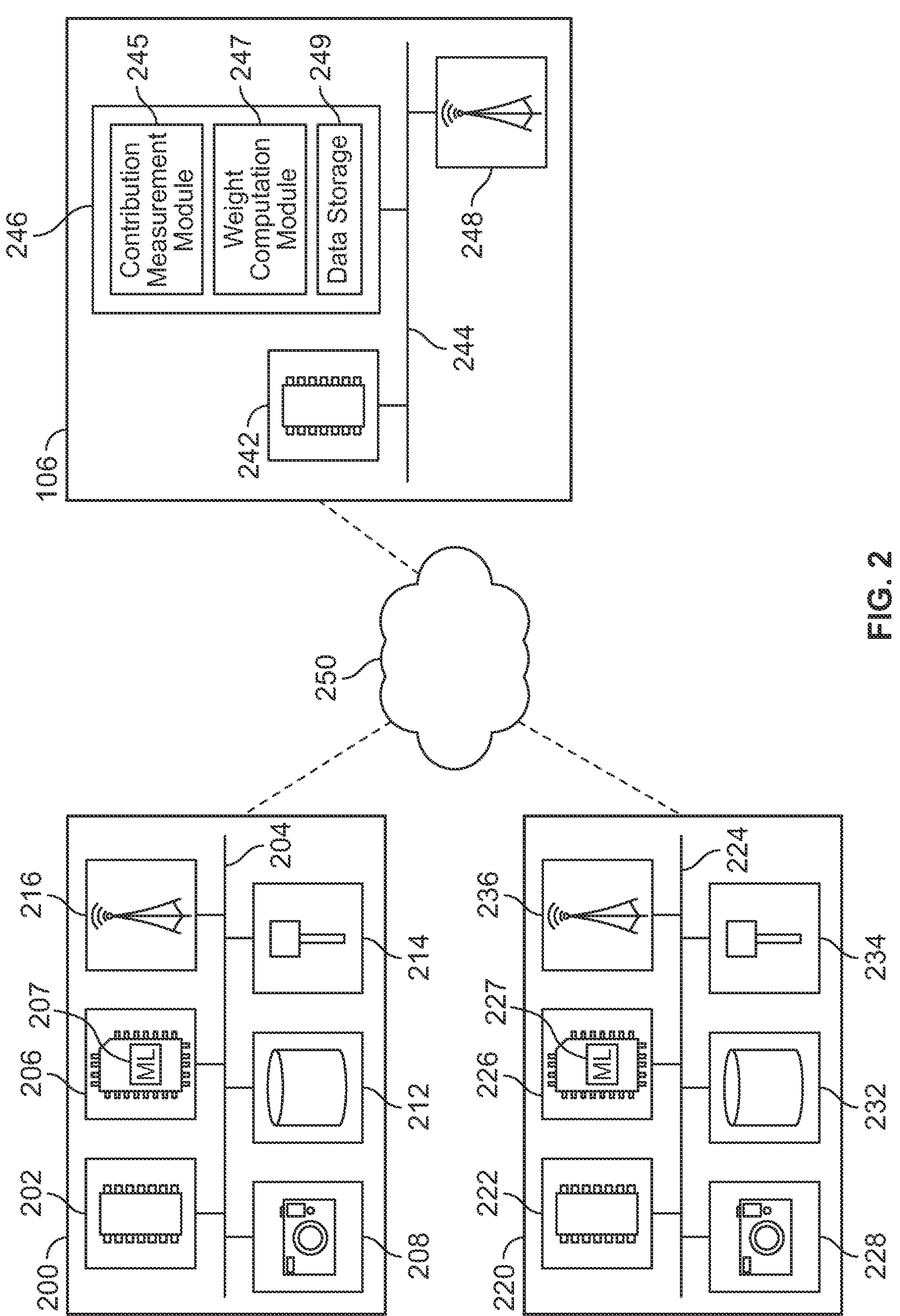
FIG. 2 depicts a schematic diagram of a system for communication-efficient model aggregation in federated networks for connected vehicle applications, according to one or more embodiments shown and described herein.

FIG. 2 depicts a schematic diagram of a system for communication-efficient model aggregation in federated networks for connected vehicle applications, according to one or more embodiments shown and described herein. The system includes a first edge node system 200, a second edge node system 220, and the server 106. While FIG. 2 depicts two edge node systems, more than two edge node systems may communicate with the server 106.

It is noted that, while the first edge node system 200 and the second edge node system 220 are depicted in isolation, each of the first edge node system 200 and the second edge node system 220 may be included within a vehicle in some embodiments, for example, respectively within two of the edge nodes 101, 103, 105, 107, 109 of FIG. 1. In embodiments in which each of the first edge node system 200 and the second edge node system 220 is included within an edge node, the edge node may be an automobile or any other passenger or non-passenger vehicle such as, for example, a terrestrial, aquatic, and/or airborne vehicle. In some embodiments, the vehicle is an autonomous vehicle that navigates its environment with limited human input or without human input. In some embodiments, the edge node may be an edge server that communicates with a plurality of vehicles in a region and communicates with a centralized server such as the server 106.

The first edge node system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC), and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first edge node system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The one or more processor 202 along with the one or more memory modules 206 may operate as a controller for the first edge node system 200.

The one or more memory modules 206 includes a machine learning (ML) model training module 207. The ML model training module 207 may train the initial model received from the server 106 using local data obtained by the first edge node system 200, for example, images obtained by imaging sensors such as cameras of a vehicle. The initial model may be a machine learning model including, but not limited to, supervised learning models such as neural networks, decision trees, linear regression, and support vector machines, unsupervised learning models such as Hidden Markov models, k-means, hierarchical clustering, and Gaussian mixture models, and reinforcement learning models such as temporal difference, deep adversarial networks, and Q-learning. Such the ML model training module may include, but not limited to, routines, subroutines, programs, objects, components, data structures, and the like for performing specific tasks or executing specific data types as will be described below. The ML model training module 207 may obtain a local gradient after training the initial model using local data. The local gradient may be computed to minimize a local cost function. The local gradient may be transmitted to the server 106 for aggregating models. In some embodiments, the ML model training module 207 may obtain parameters of a trained model, which may be transmitted to the server as an updated local model.

Referring still to FIG. 2, the first edge node system 200 comprises one or more sensors 208. The one or more sensors 208 may include a forward facing camera installed in a vehicle. The one or more sensors 208 may be any device having an array of sensing devices capable of detecting radiation in an ultraviolet wavelength band, a visible light wavelength band, or an infrared wavelength band. The one or more sensors 208 may have any resolution. In some embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. In some embodiments, the one or more sensors 208 may also provide navigation support. That is, data captured by the one or more sensors 208 may be used to autonomously or semi-autonomously navigate a vehicle.

In some embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors for gathering data that could be integrated into or supplement the data collection described herein. Ranging sensors like radar may be used to obtain a rough depth and speed information for the view of the first edge node system 200.

The first edge node system 200 comprises a satellite antenna 214 coupled to the communication path 204 such that the communication path 204 communicatively couples the satellite antenna 214 to other modules of the first edge node system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first edge node system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of a vehicle, e.g., the edge node 101. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle.

Still referring to FIG. 2, the first edge node system 200 comprises network interface hardware 216 for communicatively coupling the first edge node system 200 to the second edge node system 220 and/or the server 106. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may include an antenna, a modem, LAN port, WiFi card, WiMAX card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first edge node system 200 may transmit its data to the second edge node system 220 or the server 106. For example, the network interface hardware 216 of the first edge node system 200 may transmit vehicle data, location data, updated local model data and the like to the server 106.

The first edge node system 200 may connect with one or more external vehicle systems (e.g., the second edge node system 220) and/or external processing devices (e.g., the server 106) via a direct connection. The direct connection may be a vehicle-to-vehicle connection ("V2V connection"), a vehicle-to-everything connection ("V2X connection"), or a mmWave connection. The V2V or V2X connection or mmWave connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect, which may be in lieu of, or in addition to, a direct connection (such as V2V, V2X, mmWave) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first edge node system 200 may be communicatively coupled to the server 106 by the network 250. In one embodiment, the network 250 may include one or more computer networks (e.g., a personal area network, a local area network, or a wide area network), cellular networks, satellite networks and/or a global positioning system and combinations thereof. Accordingly, the first edge node system 200 can be communicatively coupled to the network 250 via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the second edge node system 220 includes one or more processors 222, one or more memory modules 226, one or more sensors 228, one or more vehicle sensors 232, a satellite antenna 234, and a communication path 224 communicatively connected to the other components of the second edge node system 220. The components of the second edge node system 220 may be structurally similar to and have similar functions as the corresponding components of the first edge node system 200 (e.g., the one or more processors 222 corresponds to the one or more processors 202, the one or more memory modules 226 corresponds to the one or more memory modules 206, the one or more sensors 228 corresponds to the one or more sensors 208, the one or more vehicle sensors 232 corresponds to the one or more vehicle sensors 212, the satellite antenna 234 corresponds to the satellite antenna 214, the communication path 224 corresponds to the communication path 204, the network interface hardware 236 corresponds to the network interface hardware 216, and the ML model training module 227 corresponds to the ML model training module 207).

Still referring to FIG. 2, the server 106 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The one or more memory modules 246 may include a contribution measurement module 245, a weight computation module 247 and a data storage 249. Each of the contribution measurement module 245, the weight computation module 247 and the data storage 249 may include, but is not limited to, routines, subroutines, programs, objects, components, data structures, and the like for performing specific tasks or executing specific data types as will be described below.

The contribution measurement module 245 determines contributions of local models received from a plurality of edge nodes. In embodiments, the contribution measurement module 245 may determine contributions of the local models received from a plurality of edge nodes based on angles between a global gradient and the local gradients. Specifically, the contributions may be determined based on the following equation 1.

$$\theta_i(k) = \arccos\frac{\langle \nabla G(k), \nabla G_i(k)\rangle}{\|\nabla G(k)\|\|\nabla G_i(k)\|} \quad \text{Equation 1}$$

Where $\theta_i$ is a contribution of an edge node i, $\nabla G_i(k)$ is a local gradient of the edge node i, $\nabla G(k)$ is a global gradient, and $\|\bullet\|$ is a matrix norm.

Figure 5:
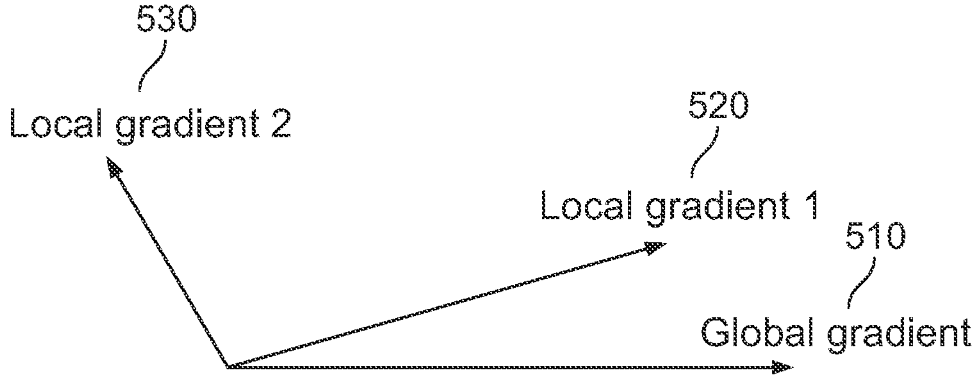
FIG. 5 depicts calculating contributions based on angles between local gradients and a global gradient, according to one or more embodiments shown and described herein.

For example, by referring to FIG. 5, the server 106 receives local gradient 520 and the local gradient 530 from the first edge node system 200 and the second edge node system 220, respectively. The global gradient 510 may be obtained by the server 106. The angle between the local gradient 520 and the global gradient 510 is less than $\pi/2$, while the angle between the local gradient 530 and the global gradient 510 is more than $\pi/2$. In this regard, the contribution of the local gradient 530 is less than the local gradient 520. In the real world, a vehicle that uploads the local gradient 530 may negatively affect a global model because the vehicle collected too less data or some outlier data. Based on Equation 1, the contribution measurement module 245 may calculate the contribution $\theta_1$ based on the local gradient 520 and the global gradient 510. Similarly, the contribution measurement module 245 may calculate the contribution $\theta_2$ based on the local gradient 530 and the global gradient 510.

Referring back to FIG. 2, the weight computation module 247 determines weights for local gradients received from edge nodes based on the contributions calculated by the contribution measurement module 245, and generates a global model based on the local gradients and the determined weights. First, the weight computation module 247 determines weights for local gradients received from edge nodes based on the contributions calculated by the contribution measurement module 245. By referring to FIG. 1, in each communication round, the edge nodes 101, 103, 105, 107, 109 upload their local gradients $G=\{g_1, g_2, g_3, g_4, g_5\}$ to the server 106. The contribution measurement module 245 calculates contributions $C=\{\theta_1, \theta_2, \theta_3, \theta_4, \theta_5\}$. The potential weights for the edge nodes 101, 103, 105, 107, 109 are denoted by $W=\{w_1, w_2, w_3, w_4, w_5\}$. Each of the weights is between 0 and 1 and the sum of the weights are 1. The weight computation module 247 designs a mapping F: $C\rightarrow W$, where F can either be an explicit function or an iterative computing process. There are two basic principles to design the function F. First, an edge node having a higher contribution should have a higher weight because higher contribution essentially means that corresponding edge node either collects more data or provides important gradient information. Second, an edge node having a higher contribution should not dominate the computation of the global gradients because some lower contribution edge nodes may also have useful information.

In order to ensure that an edge node having a higher contribution gets a higher weight, an average contribution function A(W) may be designed as Equation 2 below.

$$A(W) = \sum_{i=1}^{n}\omega_i\theta_i \quad \text{Equation 2}$$

By maximizing the A(W) function, the higher weight tends to be assigned to higher contribution vehicles. However, if the system considers this function only, it will lead us to an extreme case where only the gradient of the highest contribution edge node is utilized. This case is unfavorable because the system ignores some useful information from other edge nodes. In order to avoid the issue above, the present system designs a regularization term B(w) as Equation 3 below:

$$B(W) = -\sum_{i=1}^{n}w_i\log w_i \quad \text{Equation 3}$$

B(w) is a Shannon entropy function. The maximum of (W) is achieved when $w_i=1/n$, i.e., when every edge node is assigned equal weight regardless of its contribution. With this regularization term, the system can avoid assigning weight only to the highest contribution edge node. Therefore, the joint utility function $(W)=A(W)+\beta\cdot B(W)$ is utilized to determine the weights, where the constant $\beta$ is a hyper-parameter.

Then, the weight computation module 247 updates the weights in an evolutionary process. First, the weight computation module 247 randomly initializes the weights Wo. Then, the weight computation module 247 updates the weights with comparison-wise evolutionary dynamic as Equation 4 below.

$$d\omega_i = \sum\nolimits_{j=1}^{n}\omega_j[f_i-f_j]^+ - \omega_i[f_j-f_i]^+ \quad \text{Equation 4}$$

The potential function $f_i$ in Equation 5 below indicates how good an edge node i is in increasing a global utility.

$$f_i = \frac{\partial J}{\partial\omega_i} = \theta_i - \beta\log\omega_i \quad \text{Equation 5}$$

The weight computation module 247 compares the potential of vehicle i with the potential of every other vehicle j to adjust weights. The weight computation module 247 removes a part of the weight from an edge node having a low potential to an edge node having a high potential. The change of the weight may be proportional to the difference between their potentials. The weight that is computed by this evolutionary process is guaranteed to maximize the joint utility function, given that the joint utility function is strictly concave.

A pseudo code for updating weights is provided in Table 1 below.

TABLE 1

| Algorithm 1 Communication-Efficient Model Aggregation |
|---|
| Input: gradient information G = {g1, g2, . . . , gn}, step size $\eta$ |
| Output: Aggregated Model M(p) (p is the parameters of the model) |
| 1: Compute the contribution of vehicles C = ($\theta_1$, $\theta_2$, . . . , $\theta_n$} |
| 2: Initialize the weight W ($w_1$, $w_2$, . . . , $w_n$} |
| 3: while not converge do |
| 4: Store the weight Wprev := W in previous deration |
| 5: for i = 1 : n do |
| 6: compute the potential $f_i$, with Wprev and contribution C |
| 7: for j = 1 : n do |
| 8: compute the potential $f_j$, with $W_{prev}$ and contribution C |
| 9: compare $f_i$ with $f_j$, and compute $dw_i$, with the comparison-wise evolutionary dynamics |
| 10: adjust the weight by $w_i := w_i + dw_i$, where $\eta$ is the step size |
| 11: end for |
| 12: end for |
| 13: end while |

Once the weights are in a convergence condition, the weight computation module 247 may update a global model using the converged weights and the local gradients received from edge nodes.

The data storage 249 may store the local gradients, and determined weights. The data storage 249 may also store a global model calculated by the weight computation module 247.

Figure 3:
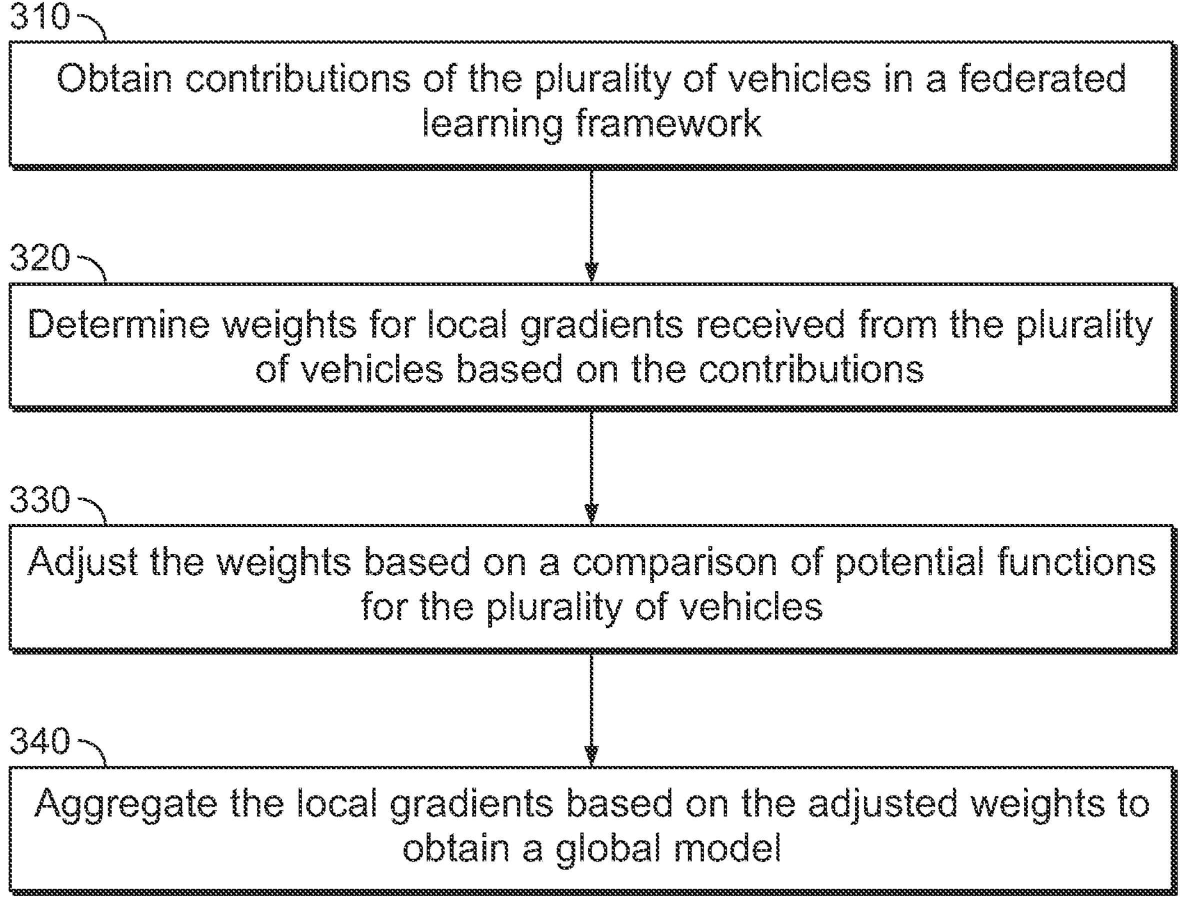
FIG. 3 depicts a flowchart for communication-efficient model aggregation in federated networks for connected vehicle applications, according to one or more embodiments shown and described herein.
Figure 4:
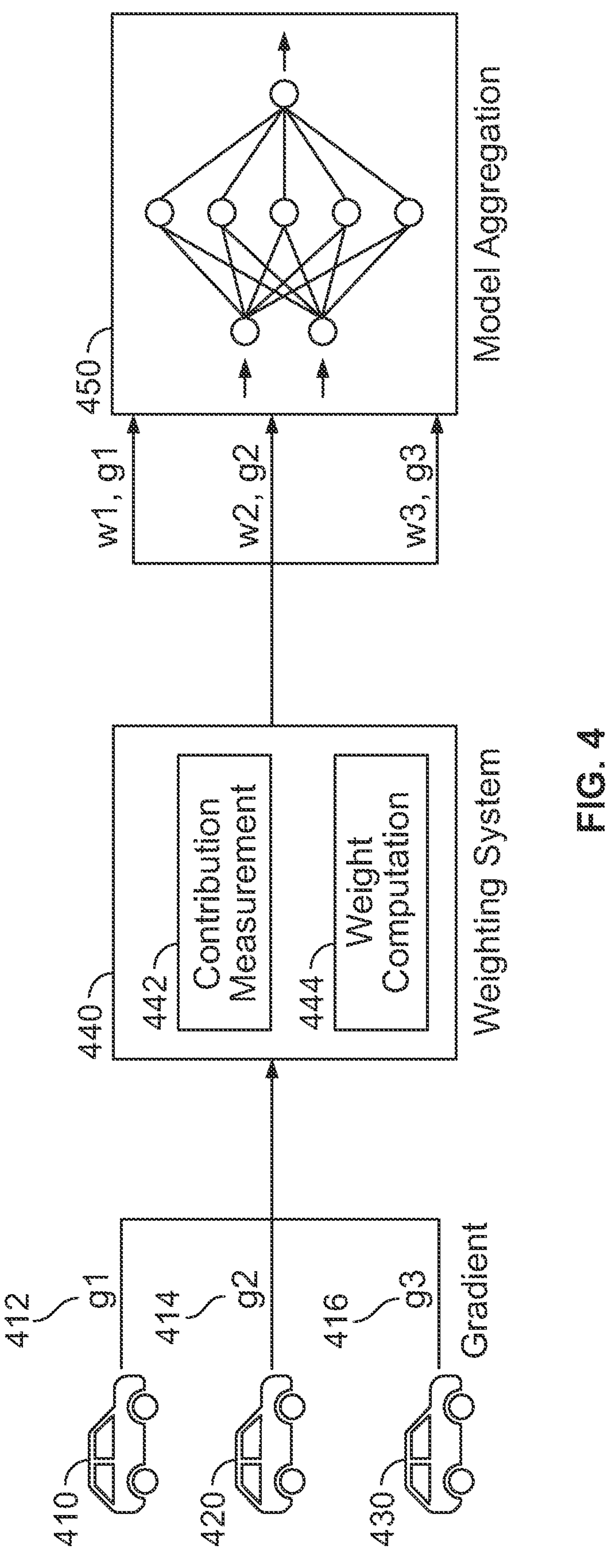
FIG. 4 depicts a schematic diagram of a system for communication-efficient model aggregation in federated networks for connected vehicle applications, according to one or more embodiments shown and described herein.

FIG. 3 depicts a flowchart for communication-efficient model aggregation in federated networks for connected vehicle applications, according to one or more embodiments shown and described herein.

In step 310, a server obtains contributions of the plurality of vehicles in a federated learning framework. In embodiments, the server receives local gradients from a plurality of edge nodes after each of the plurality of edge nodes trains its model using local data. Then, the server calculates contributions for the plurality of edge nodes based on the local gradients using Equation 1 above. For example, by referring to FIG. 4, each of the vehicles 410, 420, 430 receives a global model from a weighting system 440 of a server, and trains the global model using local data. After the training, the vehicle 410 transmits its local gradient $g_1$ 412 to the weighting system 440. Similarly, the vehicle 420 transmits its local gradient $g_2$ 414 to the weighting system 440, and the vehicle 430 transmits its local gradient $g_3$ 416 to the weighting system 440. The contribution measurement module 442 of the weighting system 440 may calculate contributions $\theta_1$, $\theta_2$, $\theta_3$ for the vehicles 410, 420, 430 based on the local gradients $g_1$, $g_2$, $g_3$ using Equation 1 above.

Referring back to FIG. 3, in step 320, the server determines weights for the local gradients received from the plurality of vehicles based on the contributions. By referring to FIG. 4, for example, the weight computation module 444 of the weighting system may determine initial weights for the local gradients 412, 414, 416. In embodiments, the initial weights may be proportional to the contributions $\theta_1$, $\theta_2$, $\theta_3$ determined in step 310. In some embodiments, the initial weights may be the same for all local gradients 412, 414, 416.

Referring back to FIG. 3, in step 330, the server adjusts the weights based on a comparison of potential functions for the plurality of vehicles. By referring to FIG. 4, the weight computation module 444 may adjust the initial weights based on a comparison of potential functions for the plurality of vehicles 410, 420, 430. The potential functions for the plurality of vehicles 410, 420, 430 may be determined according to Equation 5 above. The comparison of potential functions may be implemented according to Equation 4 above. The weight computation module 444 compares the potential of the vehicle 410 with the potentials of the vehicles 420 and 430 to adjust the weights for the vehicles 410, 420, 430. The weight computation module 444 removes a part of the weight from a vehicle having a low potential to a vehicle having a high potential. For example, if the potential of the vehicle 410 is relatively lower than the potentials of the vehicles 420 and 430, the weight computation module 444 may decrease the weight for the vehicle 410 by a certain amount, and increase the weights for the vehicles 420 and 430 by corresponding amount. The weight computation module 444 iteratively adjusts the weights in an evolutionary process until the weights are converged.

Referring back to FIG. 3, in step 340, the server aggregates the local gradients $g_1$, $g_2$, $g_3$ based on the adjusted and converged weights $w_1$, $w_2$, $w_3$ to obtain a global model. By referring to FIG. 4, the model aggregation model 450 of the server may aggregate the local gradients received from the vehicles 410, 420, 430 using the weights determined by the weight computation module 444.

Figure 6:
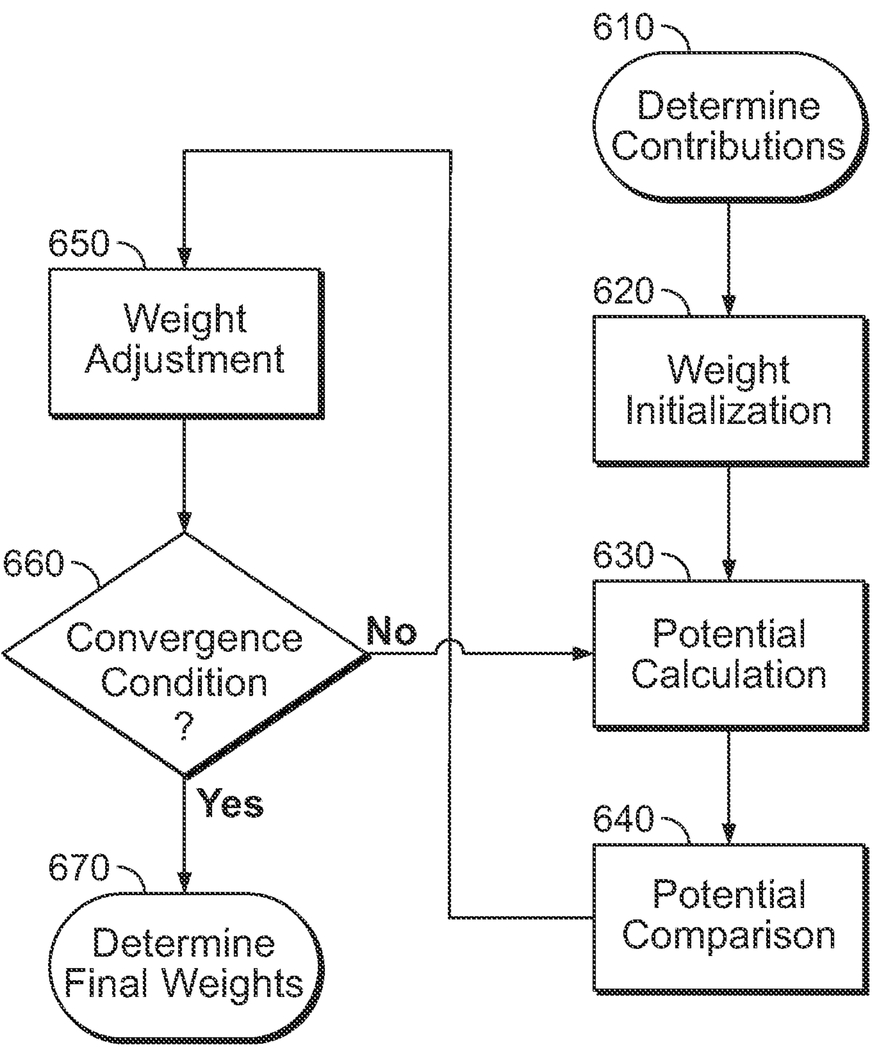
FIG. 6 is a flowchart for determining weights for edge nodes, according to one or more embodiments show and described herewith.

FIG. 6 is a flowchart for determining weights for edge nodes, according to one or more embodiments show and described herewith.

In step 610, a server determines contributions of the plurality of vehicles in a federated learning framework. In embodiments, the server receives local gradients from a plurality of edge nodes after each of the plurality of edge nodes trains its model using local data. Then, the server calculates contributions for the plurality of edge nodes based on the local gradients using Equation 1 above.

In step 620, the server initializes weights for the local gradients. In embodiments, the initial weights may be proportional to the contributions determined in step 610. In some embodiments, the initial weights may be the same for all local gradients.

In step 630, the server calculates potentials for each of the edge nodes. The potential may be calculated using Equation 5 above.

In step 640, the server compares potentials of the edge nodes. In step 650, the server adjusts weights for the edge nodes based on the comparison of the potentials, e.g., by referring to Equation 4. The weights are adjusted to maximize the joint utility function of Equation 3.

In step 660, the server determines whether the weights are in a convergence condition. If the weights are in a convergence condition, the server determines the current weights as the final weights in step 670. If the weights are not in a convergence condition, the flow goes back to step 630 and repeat weight adjustment in an evolutionary process.

It should be understood that embodiments described herein are directed to a system for communication-efficient model aggregation in federated networks for connected vehicle applications. The system includes a system including a plurality of vehicles; and a server comprising a controller. The controller obtains contributions of the plurality of vehicles in a federated learning framework, determines weights for local gradients received from the plurality of vehicles based on the contributions, adjusts the weights based on a comparison of potential functions for the plurality of vehicles, and aggregates the local gradients based on the adjusted weights to obtain a global model. The plurality of vehicles receive the global model from the server and operate based on the global model.

The present system provides communication-efficient model aggregation algorithm for hierarchical federated learning networks. Three main features of the proposed algorithm are as follows: First, the contribution of an edge node is determined by an angle between a local gradient and a global gradient. Second, the utility function for the edge node consists of an average contribution and Shannon entropy. Third, the weight for the edge node is computed by an evolutionary process. The present algorithm efficiently reduces the communication round of the federated learning process and protects private information.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A server comprising:

a controller programmed to:

obtain local gradients received from a plurality of vehicles;

determine contributions of each of the local gradients of the plurality of vehicles in a federated learning framework based on arccos of an inner product of global gradient and each of the local gradients;

determine weights for local gradients received from the plurality of vehicles based on the determined contributions;

adjust the weights based on a comparison of potential functions for the plurality of vehicles;

aggregate the local gradients based on the adjusted weights to obtain a global model; and transmit the global model to the plurality of vehicles and instruct the plurality of vehicles to autonomously operate based on the global model;

calculate a utility function based on the contributions and the weights; and calculate the potential function for each of the plurality of vehicles based on the utility function;

wherein the utility function comprises an average contribution function of the weights and the contributions and a Shannon entropy function of the weights.

2. The server of claim 1, wherein the controller is programmed to:

increase the weight for a first vehicle and decrease the weight for a second vehicle in response to determining that a value of the potential function for the first vehicle is greater than a value of the potential function for the second vehicle.

3. The server of claim 2, wherein an amount of the increase of the weight is proportional to a difference between the value of the potential function for the first vehicle and the value of the potential function for the second vehicle.

4. The server of claim 1, wherein the controller is programmed to:

obtain a plurality of local gradients from the plurality of vehicles; and determine the contributions of the plurality of vehicles based on differences between the local gradients and a global gradient vector.

5. The server of claim 1, wherein the controller is programmed to:

calculate a utility function based on the contributions and the weights; and repeat adjusting the weights until the utility function is maximized.

6. The server of claim 1, wherein the controller is programmed to:

transmit the global model to the plurality of vehicles.

7. A method for aggregating models from a plurality of vehicles, the method comprising:

obtaining local gradients received from the plurality of vehicles;

determining contributions of each of the local gradients of the plurality of vehicles in a federated learning framework based on arccos of an inner product of a global gradient and each of the local gradients;

determining weights for local gradients received from the plurality of vehicles based on the determined contributions;

adjusting the weights based on a comparison of potential functions for the plurality of vehicles;

aggregating the local gradients based on the adjusted weights to obtain a global model;

and transmitting the global model to the plurality of vehicles and instruct the plurality of vehicles to autonomously operate based on the global model;

calculating a utility function based on the contributions and the weights; and calculating the potential function for each of the plurality of vehicles based on the utility function;

wherein the utility function comprises an average contribution function of the weights and the contributions and a Shannon entropy function of the weights.

8. The method of claim 7, further comprising:

increasing the weight for a first vehicle and decrease the weight for a second vehicle in response to determining that a value of the potential function for the first vehicle is greater than a value of the potential function for the second vehicle.

9. The method of claim 8, wherein an amount of the increase of the weight is proportional to a difference between the value of the potential function for the first vehicle and the value of the potential function for the second vehicle.

10. The method of claim 7, further comprising:

obtaining a plurality of local gradients from the plurality of vehicles; and determining the contributions of the plurality of vehicles based on differences between the local gradients and a global gradient vector.

11. The method of claim 7, further comprising:

calculating a utility function based on the contributions and the weights; and repeating adjusting the weights until the utility function is maximized.

12. A system comprising:

a plurality of vehicles; and a server comprising a controller programmed to:

obtain local gradients received from the plurality of vehicles;

determine contributions of each of the local gradients of the plurality of vehicles in a federated learning framework based on arccos of an inner product of a global gradient and each of the local gradients;

determine weights for local gradients received from the plurality of vehicles based on the determined contributions;

adjust the weights based on a comparison of potential functions for the plurality of vehicles;

aggregate the local gradients based on the adjusted weights to obtain a global model; and transmit the global model to the plurality of vehicles, wherein the plurality of vehicles receive the global model from the server and autonomously operate based on the global model;

calculate a utility function based on the contributions and the weights; and calculate the potential function for each of the plurality of vehicles based on the utility function;

wherein the utility function comprises an average contribution function of the weights and the contributions and a Shannon entropy function of the weights.

13. The system of claim 12, wherein the controller is programmed to:

increase the weight for a first vehicle and decrease the weight for a second vehicle in response to determining that a value of the potential function for the first vehicle is greater than a value of the potential function for the second vehicle.

14. The system of claim 13, wherein an amount of the increase of the weight is proportional to a difference between the value of the potential function for the first vehicle and the value of the potential function for the second vehicle.

* * * * *